Oct. 11, 1960   J. LA TORRE   2,955,496
POWER OPERATED, BOLT-HOLDING WRENCH
Filed Dec. 15, 1958   3 Sheets-Sheet 1
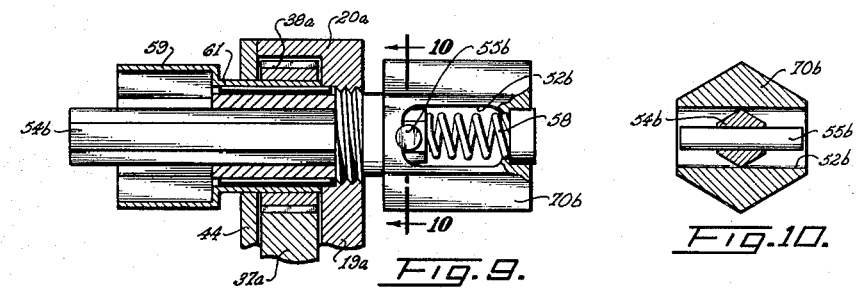
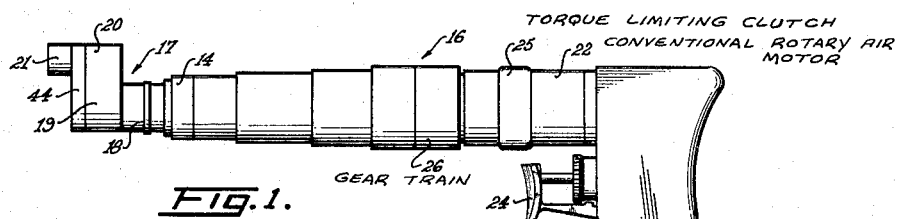
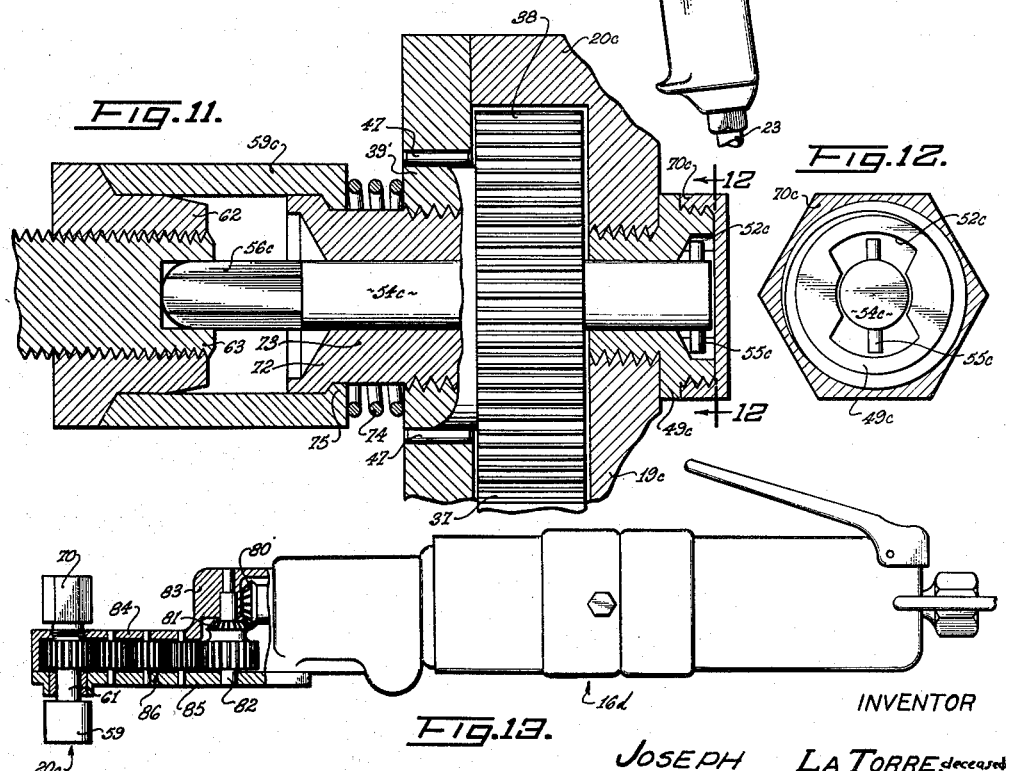
INVENTOR
JOSEPH LA TORRE, deceased
BY KATHRYN S. LA TORRE, executrix
BY Lynn H. Latta
ATTORNEY

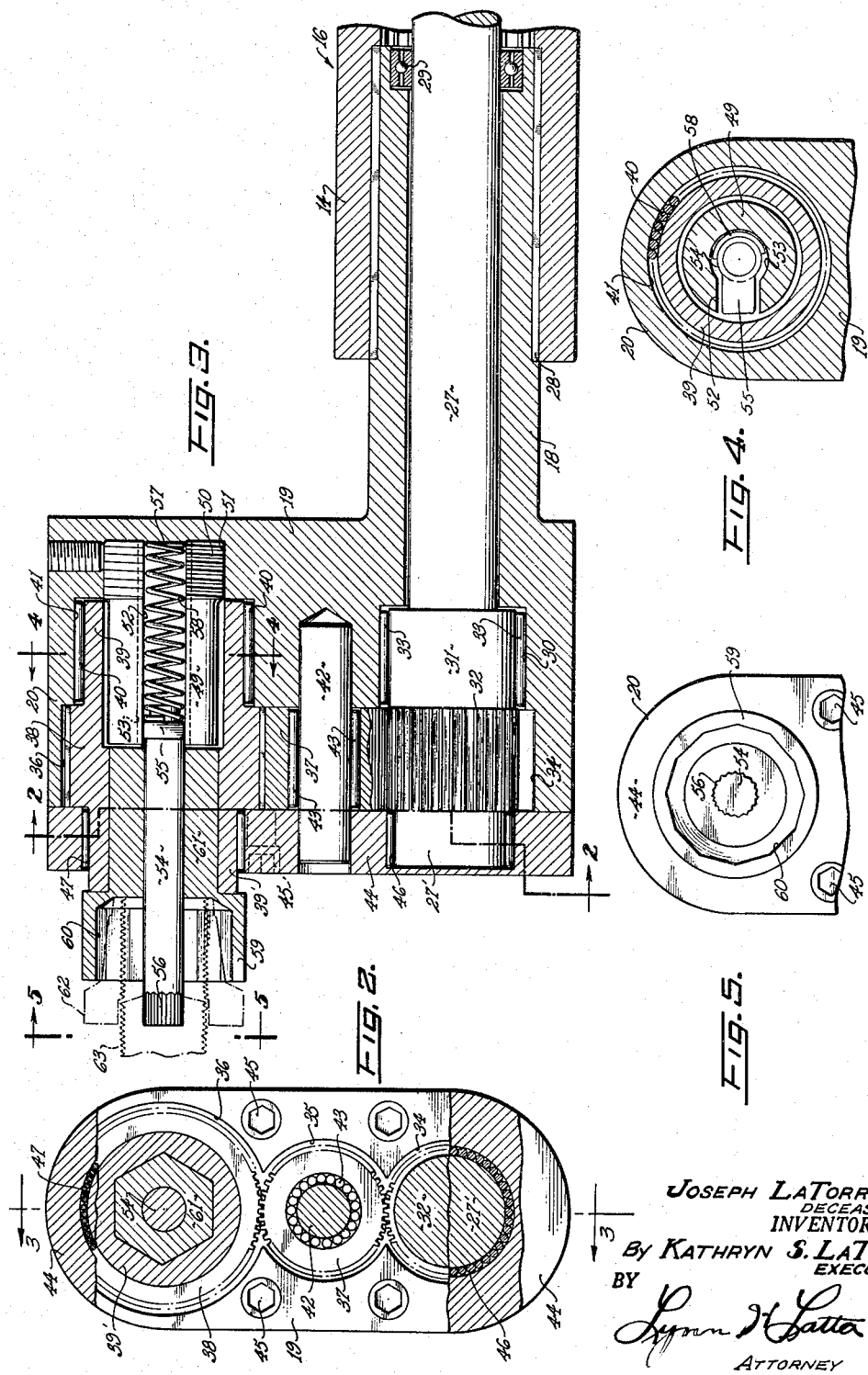

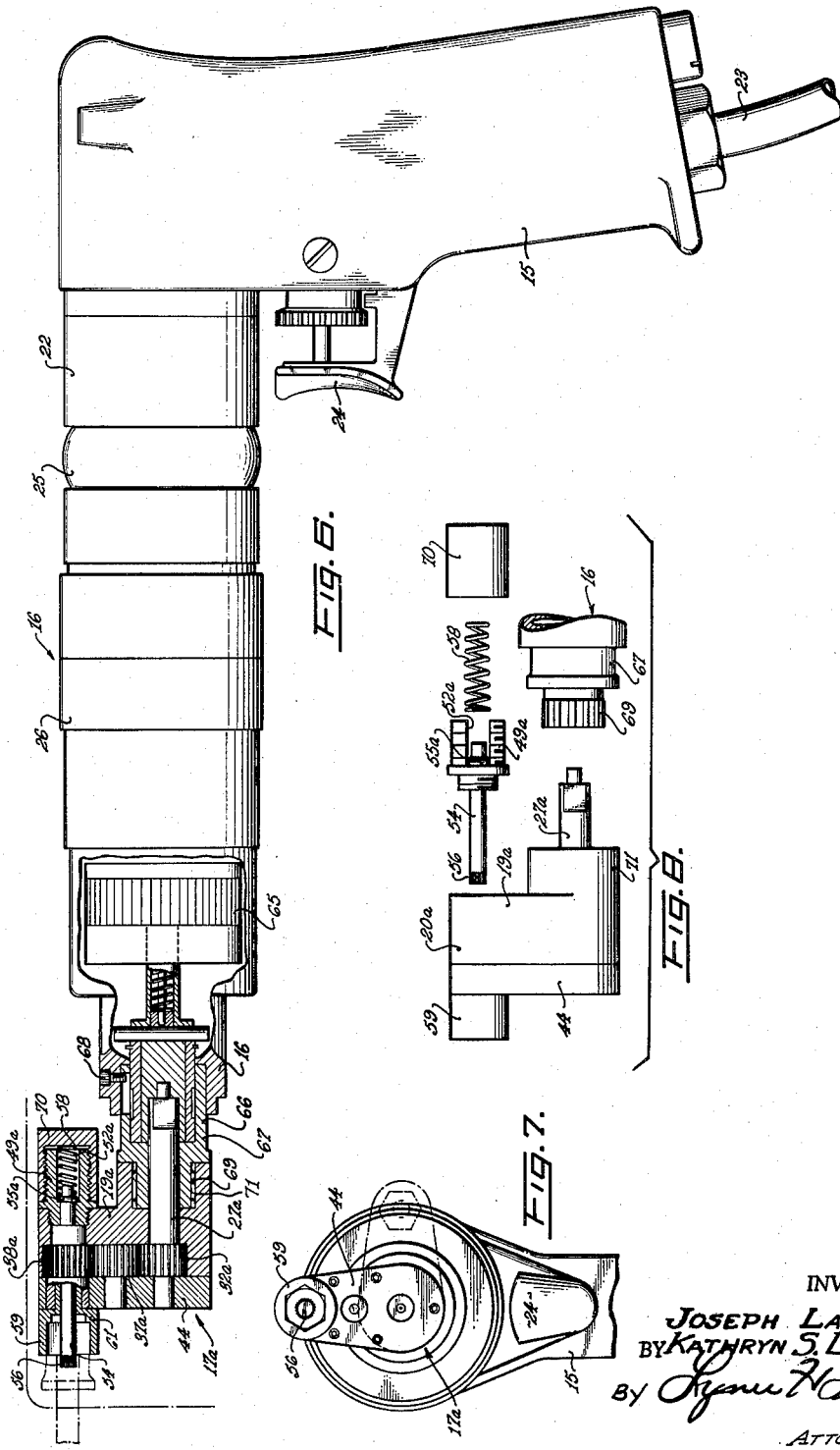

United States Patent Office 2,955,496
Patented Oct. 11, 1960

2,955,496

POWER-OPERATED, BOLT-HOLDING WRENCH

Joseph La Torre, deceased, late of Rolling Hills, Calif., by Kathryn S. La Torre, executrix, 37 Crest Road, Rolling Hills, Calif.

Filed Dec. 15, 1958, Ser. No. 780,623

13 Claims. (Cl. 81—56)

This invention relates to wrenching tools for driving nuts onto bolts and has as its general object to provide an improved wrenching tool for simultaneously holding a bolt against rotation while running the nut onto the threaded end section of the bolt and clamping it against the work in which the bolt is to function as a fastener element.

A particular object of this invention is to provide a nut-running tool which may be effectively used for wrenching a nut in a confined space or cavity such as the space between the flanges of an eye beam or channel section (e.g. the stringer of an airframe structure) wherein one flange of the structural member blocks the space along the extended axis of the bolt as installed in the opposite flange of such structural member. In particular, the invention provides a nut-running tool which has an offset driving head of minimum axial depth so as to be receivable and operative in a space of minimum width between a bolt in one flange of a structural member and the opposing flange thereof.

Actually, in most instances, the invention makes it possible to run the nuts on bolts that are installed on a common axis in both of the opposing flanges of a structural member.

Another object, in a nut-running tool having an offset head of such minimum axial proportions, is to provide maximum torque strength in the driving parts of such head.

A further object is to provide such a nut-running tool wherein the head embodies a balanced design of maximum compactness combined with maximum transmission of torque with minimum friction loss through the chain of driving parts. Also, the invention provides a tool that will transmit extremely high torque loads to high-torque fasteners used in installations where high pre-loading of the fastener against the work is a requirement.

The invention provides a nut-running tool embodying a torque-limiting device embodying the function of what has come to be commonly referred to in the art as a "torque wrench," in addition to its special characteristics of dual action against both the bolt and the nut at the same end of the fastener assembly. A particular object in this connection is to provide, in the operation of such a tool, efficient low-friction loss transmission of torque from a driving motor through the torque limiting device to the nut-wrenching head in a manner such that the torque, as applied by the head, accurately reflects the limits imposed by the torque limiting device which is immediately adjacent the power take-off shaft of the motor.

The invention further provides a nut-running tool embodying an offset wrenching head incorporating minimal edge-margin (radial clearance) characteristics combined with minimal access (axial clearance) characteristics particularly meeting the increasingly difficult problems of nut running in modern small high speed airframe construction wherein the cross sectional dimensions of structural members are being progressively diminished, thus diminishing the dimensions of the access spaces therein.

The invention aims to combine these minimal edge-margin and access characteristics with the maximum torque load transmitting characteristic referred to above.

A further object is to provide, in such a tool, an offsetting arm joining the wrenching head to the main housing of the tool and having a connection therewith such that the head may be indexed around the main axis (of the housing) to any selected operating position throughout a 360° range, with such operating positions being spaced at increments as small as 15°, whereby the head may be disposed at either side of the main plane of the tool (where the tool utilizes a pistol grip handle, this plane would be the common plane of the main axis and of the pistol grip) or may be disposed above or below the main axis or at any intermediate position, depending upon the conditions existing in the work. Specifically, the invention provides an arrangement wherein a driving head, including a wrenching socket rotating on an axis parallel to the main axis is offset to or beyond the major diameter of the main housing, so that it can be used to drive a nut that is close to a wall parallel to the driving axis.

Other objects and advantages will become apparent in the ensuing specification and appended drawing in which:

Fig. 1 is a side elevation of a nut-running tool embodying my invention, as incorporated in an offset or Z-axis drive tool utilizing a pistol grip handle;

Fig. 2 is a front end sectional view of the offset head of the tool, taken on the line 2—2 of Fig. 3, with the driving socket and cover plate removed to illustrate the internal gearing thereof;

Fig. 3 is a detail sectional view, on an enlarged scale, of the offset drive portion of the tool, taken on the line 3—3 of Fig. 2;

Fig. 4 is a fragmentary transverse sectional view through the driving head taken as indicated on the line 4—4 of Fig. 3;

Fig. 5 is a fragmentary front face view of the driving head;

Fig. 6 is a leftward side elevational view of a tool embodying a modified form of the offset driving mechanism, with the gearing and wrenching socket portions thereof broken away and shown in axial section;

Fig. 7 is a front end view of the tool of Fig. 6;

Fig. 8 is an exploded side view of the offset driving mechanism of Fig. 6;

Fig. 9 is an enlarged, fragmentary axial sectional view of a driving head embodying a modified form of the invention viewed from the leftward side thereof;

Fig. 10 is a transverse sectional view taken on the line 10—10 of Fig. 9;

Fig. 11 is an enlarged fragmentary axial sectional view, partially in leftward side elevation, of another modified form of the invention;

Fig. 12 is a transverse sectional view of the driving head of Fig. 11, taken on the line 12—12 of Fig. 11; and Fig. 13 is a side elevation, partially broken away and shown in section, illustrating the invention as applied to a conventional 90° tool.

Referring now to Fig. 1 of the drawings, the invention as shown therein may be embodied in a nut running tool having, in general, a pistol grip handle 15, a main drive housing assembly 16 terminating in a coupler sleeve 14; and an offset or Z-axis drive transmitting unit 17 coupled to sleeve 14. The unit 17, in general, incorporates a neck socketed in sleeve 14, an offset drive housing arm 19, and a driving head 20 terminating in a nut-engaging socket 21.

Although forming no part of the present invention, the tool may incorporate a conventional air motor 22 actuated by air under pressure coming through an air supply line 23 under the control of a trigger 24 and driving into a planetary gear train 25 which reduces the rotor speed and increases the torque as transmitted from said planetary transmission to a torque limiting clutch 26 and thence to the main drive shaft 27 (Fig. 3) which extends axially from main housing 16 into the neck 18 of the Z-drive unit 17.

It will be understood that the invention need not necessarily utilize an air drive motor, but could use either an electric motor or a hand operating turning mechanism.

The neck 18 is secured in the end of housing mechanism 16 by a splined connection indicated at 28.

*The preferred form of the invention—Figs. 1–5*

Shaft 27 is journalled in suitable bearings in housing 16, including a ball-bearing 29 in the rear end of neck 18, and extends through the neck 18 and into a coaxial counterbore 30 in the inner and of offset arm 19, where it integrally joins the hub 31 of an integral drive gear 32, hub 31 being journalled in a sleeve of needle bearings 33 in the counterbore 30.

In the front face of drive housing arm 19 are intersecting cylindrical gear chamber bores 34, 35 and 36 (Fig. 2) in which are received respectively the drive gear 32, an idler gear 37 meshing therewith, and a driven gear 38, the latter being disposed in the driving head 20 on the wrenching axis thereof. Gear 38 has a hub 39 which is journalled in a sleeve of needle bearings 40 disposed in a counterbore 41 at the base of gear chamber 36 and coaxial therewith. Idler gear 37 is tubular, having a cylindrical bore and is journalled on a fixed stud shaft 42 through the medium of an interposed sleeve of needle bearings 43. The gears 32, 37 and 38 are confined in their gear chambers 34, 35 and 36 by a cover plate 44 having the same outline form as offset arm 19 and secured to the front face thereof by cap screws 45 the heads of which are sunk in counterbores (not shown) in the cover and the shanks of which are threaded into arm 19. Cover plate 44 has respective cylindrical bores which respectively receive needle bearings 46 and 47 and the forwardly projecting end portion of stub shaft 42. The gear 32 has a forwardly projecting end portion 27' of shaft 27 which is journalled in the bearing 46 and the gear 38 has a forward hub 39' which is journalled in the bearing 47. Driven gear 38 is of larger diameter than drive gear 32, such as to provide a drive ratio of approximately 1:2 from the drive shaft to the gear 38.

The driving head 20 includes, in addition to the gear 38, a mandrel carrier 49 of generally cylindrical form, having a slightly enlarged threaded base 50 which is secured in an internally threaded bore 51 in the outer end of arm 19, coaxial with gear 38. The mandrel carrier 49 is of C-section transversely, having in one side an axially extending slot 52 which communicates with an axial bore 53 in the center of the carrier. The carrier 49 extends into the bore of gear hub 39, which is free to rotate around the carrier.

Connected to the carrier 49, for axially sliding movement, is a cylindrical mandrel 54 having at its rear end an integral key 55 projecting radially therefrom and engaged in the slot 52, with circumferential clearance sufficient to provide for limited oscillating movement of the mandrel 54 within the carrier 49 for orientation of a standard twelve point double hexagon (or splined) male wrenching tip 56 for engagement in a socket in the threaded end of a bolt 63 to be held stationary while a nut 62 is run onto the bolt. The amount of lost motion between the mandrel 54 and carrier 49 may be in the range of approximately between 15° and 20°, to accommodate a lost motion of somewhat more than half the angular distance between the driving points of the tip 56. Disposed between the rear end of mandrel 54 and a closed rear end 57 of carrier 49, within the bore 53, is a coil spring 58 which functions to yieldingly drive the mandrel 54 forwardly in the carrier 49 to a normally projected position for initial engagement of the tool with the bolt. Attached to the forward hub 39' of gear 38 is a nut wrenching socket 59 into which a nut may be inserted just prior to inserting the projected tip 56 of the mandrel into the bolt socket.

The socket 59 embodies twelve point or double hexagon internal wrenching teeth 60 and is integral with a wrenching arbor or a hub 61 of hexagonal cross section externally projecting from the rear end thereof and received in a correspondingly hexagonal recess in the forward hub portion 39' of gear 38, to receive drive therefrom. The hub 61 has a snug fit in the gear hub 39' so that the driving socket 59 is held in place by friction.

The mandrel 54 extends through an axial bore in the arbor 61, which is fitted to the mandrel snugly so as to support it in coaxial assembly therewith, but yet is freely rotatable therearound.

The tool of my invention is particularly adapted for setting up a nut and bolt fastener of the type shown in the pending application S.N. 657,373 of Joseph LaTorre, filed May 6, 1957 for Combination Bolt and Locking Nut, now Patent No. 2,897,867, issued Aug. 4, 1959, embodying a bolt having a socketed threaded end which is shown at 63 in Fig. 3, and a nut of a special design which is shown at 62.

Reviewing the operation of the tool, it may be noted initially that installation is rapidly and simply achieved from one side of the work. With a nut carried in the driving socket 59, the driving tip 56 of the mandrel may be instantly engaged in the socket in the bolt tip 63 without requiring any twisting or turning of the tool. This may be facilitated by slight chamfering of the mating ends of the teeth in the bolt socket and the driving tip 56. With the mandrel in its projected position, the nut will be disposed somewhat behind the tip of the bolt. Then, by applying forward pressure to the driving head 20 through the main body of the tool, the head 20 may be moved forwardly (while the mandrel 54 is held stationary by its engagement with the bolt) so as to bring the nut into engagement with the threaded end of the bolt. With a light pressure on the handle of the gun, the counterbored leading end of the nut 62 freely slips over the lead threads of the bolt, thus lining up the nut and bolt to avoid any possibility of cross-threading. The mandrel 54 yields rearwardly slightly as the nut is pushed over the bolt. The operator then merely pulls the trigger and the nut is quickly run onto the bolt and into engagement with the work, whereupon the torque control provided by the adjustable torque limiting clutch 26, arrests the driving action when exactly the right amount of pre-loading of the fastener against the work has been attained.

As the nut is run onto the bolt, forward pressure being continuously applied to the driving head 20, the bolt, relatively, will be drawn into the nut and will cause the mandrel 54 to be retracted to a deeper position in the head 20, compressing the coil spring 58. When the nut has been set up tight against the work and the tool is withdrawn, the spring 58 will automatically project the mandrel 54 back to its normal position for starting the application of another nut to another bolt.

*Modified form—Figs. 6, 7 and 8*

Referring now to Figs. 6, 7 and 8, the driving gun shown therein may be the same as that illustrated in Fig. 1, an end portion of torque limiter 26 being illustrated at 65.

Interposed between the end of main housing 16 and the offset driving unit 17a is an adapter unit 66, including a collar portion 67 secured in the housing 16 by a set screw 68 and having a splined male tip 69 to which the offset driving unit 17a may be coupled in any selected position of indexing around the main axis of drive shaft 27a, a normal position being shown in full lines in Fig. 7 and an adjusted position being shown in broken lines therein.

Gears 32a, 37a and 38a provide a 1:1 ratio drive from shaft 27a to the wrenching arbor 61, and although not shown, suitable bearings may be disposed between the trunnions and the hubs of these three gears and the offset arms 19a and cover 44 respectively. In lieu of the arrangement of Fig. 3 in which the mandrel is fully enclosed within the arm 19, the mandrel 49a in this form of the invention has a neck threaded into the rear side of arm 19a, and has a threaded cap 70 retaining the mandrel follower spring 58 in compression-loading engagement with the rear end of mandrel 54, the cap 70 being removable for assembling or disassembling the mandrel 54. On its rear end, mandrel 54 has a cross head 55a providing diametrically opposed keys which are slidably engaged in respective sides of a through slot 52a in the mandrel holder 49a. These parts are more clearly shown in the exploded view illustrated in Fig. 8. In lieu of the elongated neck 18 of Fig. 3, offset arm 19a has an internally splined collar 71 which mates with the male splined tip 69 of the adapter 67.

*Modified form—Figs. 9 and 10*

In the further modified form of the invention shown in Figs. 9 and 10, the construction is similar to that shown in Figs. 6–8 (and corresponding reference numerals are applied thereto) with the following exceptions: the mandrel 54b is of square or hexagonal bar form and its rear end is provided with a cross pin 55b extending through and press-fitted in a cross bore therein, the respective ends of cross pin 55b constituting keys received in a through slot 52b in spring retainer cap 70b, with substantial oscillatory lost motion therein to facilitate the entry of the forward end of the mandrel 54b into a socket in the tip of the bolt.

*Modified form—Figs. 11 and 12*

In the form of the invention shown in Figs. 11 and 12, the construction corresponds to that of Fig. 3 (and corresponding numerals are used on corresponding parts) with the following exceptions: the nut wrenching socket 59c is slidably mounted upon a male hexagonal or squared head 72 on the wrenching arbor 73 which is secured (as by threading) in the hub 39' of driven gear 38. The arbor 73 is of sufficient length between its head 72 and the hub 39' to accommodate a retracting movement of the socket 59c thereon, when the nut 62, as mounted in the socket 59c, is applied to the threaded tip of bolt 63 and pressure is applied to advance the bolt holding mandrel 54c so as to insert its holding tip 56c into the tip socket of the bolt 63, the nut being restrained by initial contact with the tip of the bolt 63. Such retracting movement of the wrenching socket 59c is yieldingly opposed by a coil spring 74 which normally holds the socket 59c in the forwardly projected position shown in Fig. 11, limited by the engagement of an internal flange 75 of socket 59c against the head 72. Since relative axial movement between the mandrel and the wrenching socket 59c is thus provided for by this slidable connection between the socket and the arbor 73, the mandrel 54c is retained with substantially no axial shifting movement relative to the arbor 73 and arms 19c, by means of the abutting engagement of the rear end of the mandrel 54c against retainer cap 70c, which is threaded upon holder 49c. Holder 49c in turn is mounted in offset arm 19c by means of a threaded neck thereon, the same as in Figs. 7 and 8 and in Figs. 9 and 10. Cap 70c is removable for assembly and disassembly of the mandrel 54c. A cross pin 55c has respective ends constituting keys engaged for limited relative oscillating movement in diametrically opposed segmental recesses 52c (Fig. 12) in the outer end of mandrel holder 49c.

*Modified form—Fig. 13*

Fig. 13 illustrates how the invention may be applied to a right-angle crank drive in lieu of the offset arrangement of the previous figures. Here the main drive shaft coming from the torque clutch is provided with a bevel gear 80 which drives a bevel gear 81 on a countershaft 82 journalled transversely in a shoulder portion 83 of an arm 84 which extends from the end of main housing 16d parallel and eccentric to the main drive axis. Between the arm 84 and a cover plate 85, in a gear chamber formed in the arm 84, is a train of gears indicated generally at 86, beginning with a spur gear on the bevel gear 81 and terminating with a spur gear on the wrenching arbor 61, likewise disposed on a transverse axis so that the wrenching socket 59 may operate on an axis transverse to the main axis of housing 16d. The structure of the driving head 20a may be the same as in the driving head 20a of Figs. 6–8, as indicated by corresponding reference numerals.

I claim:

1. In a nut-running tool for simultaneously holding a bolt having in its tip a socket of non-cylindrical cross section and for rotating a nut having external wrenching faces, in combination: a driving gun; a drive transmitting unit including a drive housing arm extending from said gun; a wrenching arbor journalled the outer end of said arm on a transverse axis and having a cylindrical bore; a bolt holding mandrel supported in said bore with said arbor rotatable there-around, said mandrel having an outer end portion projecting from said arm and terminating in a holding tip for engagement in the bolt socket, and having at its rear end a radially projecting key; a wrenching socket on the outer end of said arbor and encircling said projecting end portion of the mandrel for reception of and wrenching engagement with a nut to be threaded onto said bolt; a mandrel carrier mounted in the outer end portion of said drive housing arm, coaxial with said arbor and having an axial recess adapted to receive the arbor with the arbor sliding axially therein, said recess extending to the lateral wall of said carrier to provide a guide slot parallel to its longitudinal axis, said radially projecting key being received in said slot for sliding movement and engaged by a margin of said slot for holding said mandrel against rotation, thus to hold said bolt against rotation; yielding means acting on said mandrel to normally maintain it in a forwardly projected position relative to said wrenching socket; a drive shaft extending into said drive housing arm for transmitting drive from said gun; and a chain of gearing in said arm for transmitting drive from said drive shaft to said arbor.

2. A nut-running tool as defined in claim 1, wherein said key has limited oscillatory lost motion between the margins of said slot to facilitate orientation of said mandrel driving tip in said bolt socket.

3. A nut-running tool as defined in claim 1, wherein said drive housing arm is an offsetting arm extending transversely to the axis of said drive shaft, and the axis of said arbor is parallel to said drive shaft axis.

4. A nut-running tool as defined in claim 1, wherein said drive housing arm extends from said gun parallel and eccentric to the axis of said drive shaft, and the axis of said arbor is transverse to said drive shaft axis.

5. A tool as defined in claim 1, wherein said driven gear is tubular having at its forward end a driving socket surrounding and in driving engagement with the periphery of said arbor and having in its rear end a counterbore receiving said mandrel carrier.

6. A tool as defined in claim 1, wherein said driven gear has respective tubular hubs on its forward and rear ends, said drive housing arm having a counterbore receiving the rear hub and a bearing operating in said counterbore and rotatably mounting said rear hub, and wherein said drive housing arm includes a cover plate detachably secured to its forward face and having a bore receiving said forward hub and a bearing in said bore in which said forward hub is journalled.

7. In a nut-running tool for simultaneously holding a bolt having in its tip a socket of non-cylindrical cross section and for rotating a nut having external wrenching faces, in combination: a driving gun having at its forward end a coupler part provided with non-cylindrical coupler faces; an offset drive transmitting unit of Z-form including a neck having coupler means meshing with said coupler faces to secure said driving unit to the forward end of said gun in any one of a plurality of selected operating positions indexed around the main axis of said gun, said driving unit further including a gear housing arm extending radially from said neck, a wrenching arbor journalled in the outer end of said arm on an axis parallel to that of said neck and having a cylindrical bore, a bolt holding mandrel supported in said bore with said arbor rotatable there-around, said mandrel having an outer end portion projecting from said mandrel on the side of said arm opposite said neck and terminating in a holding tip for engagement in the bolt socket; a wrenching socket on the outer end of said arbor and encircling said projecting end portion of the mandrel for reception of and wrenching engagement with a nut to be threaded onto said bolt; a mandrel carrier mounted in the outer end portion of said drive housing arm in coaxial end to end relation to said arbor and having an axially extending recess adapted to receive the arbor with the arbor sliding axially therein, said mandrel carrier having in its lateral wall a guide slot parallel to its axis and communicating with said recess; said mandrel having at its rear end a radially projecting key received in said slot for sliding movement and engaged by a margin of said slot for holding said mandrel against rotation, thus to hold said bolt against rotation; said key having limited oscillatory lost motion between the sides of said slot to facilitate orientation of said mandrel driving tip in said bolt socket; a coil spring under compression mounted between the rear end of said mandrel and the rear end of said mandrel carrier bore; a motor in said gun; a drive shaft extending through and journalled in said neck, for transmitting drive from said motor; and a chain of spur gearing in said arm for transmitting drive from said drive shaft to said arbor, including a driving gear on said drive shaft; a driven gear on said arbor; and an idler gear interposed between and meshing with said driving gear and driven gear.

8. In a nut-running tool for simultaneously holding a bolt having in its tip a socket of non-cylindrical cross section and rotating a nut having external wrenching faces, in combination: a driving gun having at its forward end a sleeve having a holding socket provided with internal non-cylindrical holding faces; an off-set driving unit of Z-form including a neck having external holding means meshing with said holding faces to secure said driving unit in said sleeve in any one of a plurality of selected operating positions indexed around the main axis of said gun; said driving unit further including an arm extending radially from said neck; a wrenching arbor journalled in the outer end of said arm on an axis parallel to that of said neck and having a cylindrical bore; a bolt holding mandrel supported in said bore with said arbor rotatable therearound, said mandrel having an outer end portion projecting from said mandrel on the side of said arm opposite said neck and terminating in a holding tip for engagement in the bolt socket; a wrenching socket formed integrally on the outer end of said arbor and encircling said projecting end portion of the mandrel for reception of and wrenching engagement with a nut to be threaded onto said bolt; a mandrel carrier mounted in the outer end portion of said drive housing arm in coaxial end to end relation to said arbor and having an axial bore adapted to receive the arbor with the arbor sliding axially therein, said mandrel carrier having in its lateral wall a guide slot parallel to its axis and communicating with said bore, said mandrel having at its rear end a radially projecting key received in said slot for sliding movement and engaged by a margin of said slot for holding said mandrel against rotation, thus to hold said bolt against rotation, said key having limited oscillatory lost motion between the sides of said slot to facilitate orientation of said mandrel driving tip in said bolt socket; a coil spring under compression mounted between the rear end of said mandrel and the rear end of said mandrel carrier bore; a drive shaft extending through and journalled in said neck, for transmitting drive from a motor in said gun; and a chain of spur gearing in said arm for transmitting drive from said drive shaft to said arbor, including a driving gear on said drive shaft, a driven gear on said arbor and an idler gear interposed between and meshing with said driving gear and driven gear, said driving gear having a diameter ratio to said driven gear such as to provide a drive ratio of 1:2.

9. In a nut-running extension of a driving gun having a motor, for simultaneously holding a bolt having in its tip a socket of non-cylindrical cross section and for rotating a nut having external wrenching faces, in combination: a drive transmitting unit including a drive housing arm extending from said gun; a wrenching arbor journalled in the outer end of said arm on a transverse axis and having a cylindrical bore; a bolt-holding mandrel supported in said bore with said arbor rotatable therearound, said mandrel having an outer end portion projecting from said arm and terminating in a holding tip for engagement in the bolt socket; a wrenching socket on the outer end of said arbor and encircling said projecting end portion of the mandrel for reception of and wrenching engagement with a nut to be threaded onto said bolt; a mandrel carrier mounted in the outer end portion of said drive housing arm, coaxial with said arbor and having an axial recess adapted to receive the arbor with the arbor sliding axially therein, said recess extending to the lateral wall of said carrier to provide a guide slot parallel to its longitudinal axis, said mandrel having at its rear end a radially projecting key received in said slot for sliding movement and engaged by a margin of said slot for holding said mandrel against rotation, thus to hold said bolt against rotation, said key having circumferential clearance in said slot for limited oscillatory lost motion to facilitate orientation and entry of said holding tip in said bolt socket; a coil spring in said recess acting under compression between said mandrel and the end of said recess to normally maintain said mandrel in a forwardly projected position relative to said wrenching socket; a drive shaft extending into said drive housing arm for transmitting drive from said gun; and a chain of gearing in said arm for transmitting drive from said drive shaft to said arbor.

10. In a nut-running tool for simultaneously holding a bolt having in its tip a socket of non-cylindrical cross section and for rotating a nut having external wrenching faces, in combination: a driving gun; a drive transmitting unit including a drive housing arm extending from said gun; a wrenching arbor journalled in the outer end of said arm on a transverse axis and having a cylindrical bore; a pair of wrenching mmebers, one of which is a wrenching socket driven by the outer end of said arbor, for reception of and wrenching engagement with a nut to be threaded onto said bolt and the other of which is a bolt holding mandrel supported in said bore with said arbor rotatable there-around, one of said wrenching members being mounted for axial sliding movement with reference to the other, said mandrel having a forward end portion projecting from said arm and terminating in a holding tip for engagement in the bolt socket, and having at its rear end a radially projecting key; said wrenching socket encircling said projecting end portion of the mandrel; a holding part mounted in the outer end portion of said drive housing arm, coaxial with said arbor and having a recess, said radially projecting key being received in said recess for holding said mandrel against rotation, thus to hold said bolt against rotation; yielding means acting on one of said wrenching members to normally maintain it in a forwardly projected position relative to the other wrenching member; a drive shaft extending into said drive housing arm for transmitting drive from said gun; and a chain of gearing in said arm for transmitting drive from said drive shaft to said arbor.

11. A tool as defined in claim 10, wherein said key is in the form of a pin extending through a diametral bore in the rear end of said mandrel and having projecting ends, and wherein said recess comprises diametrically opposed segmental cavities receiving respective ends of said pin with circumferential clearance for limited rotary lost motion between said pin ends and said holding part, for facilitating the alignment of said mandrel in the bolt tip socket.

12. In a power-operated, bolt-holding wrench for simultaneously holding a bolt having in its tip a socket of non-cylindrical cross section and for rotating a nut having external wrenching faces, in combination: a driving gun; a drive-transmitting unit including a drive housing arm extending from said gun; a pair of wrenching members, one of which is an arbor journalled in the outer end of said arm on a transverse axis and having a cylindrical bore and, at its outer end, a wrenching socket for reception of and wrenching engagement with a nut to be threaded onto said bolt, the other of said wrenching members being a bolt-holding mandrel axially slidable in said bore with said arbor rotatable therearound, said mandrel having a forward end portion projecting from said arm and terminating in a holding tip for engagement in the bolt socket, and having at its rear end a radially projecting key; said wrenching socket encircling said projecting end portion of the mandrel; said driving housing arm having in its outer end portion a holding part axially aligned with said arbor and providing an axially extending recess in which said radially projecting key is axially slidable for holding said mandrel against rotation while permitting it to follow said bolt; yielding means acting on the rear end of said mandrel to normally maintain it in a forwardly projecting position relative to the wrenching socket; a drive shaft extending into said drive housing arm for transmitting drive from said gun; and a chain of gearing in said arm for transmitting drive from said drive shaft to said arbor, for rotating the same.

13. In a power-operated, bolt-holding wrench for simultaneously holding a bolt having in its tip a socket of non-cylindrical cross section and for rotating a nut having external wrenching faces, in combination: a driving gun having at its forward end a sleeve having a holding socket provided with internal non-cylindrical holding faces; an off-set driving unit of Z-form including a neck having external holding means meshing with said holding faces to secure said driving unit in said sleeve in any one of a plurality of selected operating positions indexed around the main axis of said gun; said driving unit further including a drive housing arm extending radially from said neck; a pair of wrenching members, one of which is an arbor journalled in the outer end of said arm on a transverse axis and having a cylindrical bore and, at its outer end, a wrenching socket for reception of and wrenching engagement with a nut to be threaded onto said bolt, and other of said wrenching members being a bolt-holding mandrel supported in said bore with said arbor rotatable therearound, said mandrel having a forward end portion projecting from said arm and terminating in a holding tip for engagement in the bolt socket, and having at its rear end a radially projecting key; said wrenching socket encircling said projecting end portion of the mandrel; said driving housing arm having in its outer end portion a holding part axially aligned with said arbor and providing a recess in which said radially projecting key is received for holding said mandrel against rotating so as to hold said bolts; one of said wrenching members being mounted for axial sliding movement with references to the other; yielding means acting on said one wrenching member to normally maintain it in a forwardly projecting position relative to the other; a drive shaft extending into said drive housing arm for transmitting drive from said gun; and a chain of gearing in said arm for transmitting drive from said drive shaft to said arbor, for rotating the same.

References Cited in the file of this patent

UNITED STATES PATENTS

| | | |
|---|---|---|
| 663,884 | Groom | Dec. 18, 1900 |
| 667,044 | Thorsen | Jan. 29, 1901 |
| 1,343,667 | Evensen | June 15, 1920 |
| 1,659,838 | Schoeb | Feb. 21, 1928 |
| 2,275,633 | Keiser | Mar. 10, 1942 |
| 2,630,731 | Imboden | Mar. 10, 1953 |
| 2,645,965 | Resch | July 21, 1953 |
| 2,882,773 | Wing | Apr. 21, 1959 |